United States Patent [19]

Shakalis

[11] Patent Number: 4,696,428

[45] Date of Patent: Sep. 29, 1987

[54] ELECTRONIC FLUID TEMPERATURE FLOW CONTROL SYSTEM

[76] Inventor: Paul Shakalis, 19 Gordon Ave., Plainview, N.Y. 11803

[21] Appl. No.: 884,051

[22] Filed: Jul. 10, 1986

[51] Int. Cl.⁴ ............................................. G05D 23/13
[52] U.S. Cl. ..................................... 236/12.12; 4/192; 137/607
[58] Field of Search ................ 236/12.11, 12.12, 12.1, 236/12.13; 364/502; 4/192; 137/607

[56] References Cited

U.S. PATENT DOCUMENTS 4,322,031  3/1982  Gehlert ........................... 236/12.1
4,420,811  12/1983  Tarnay ........................... 137/561 R
4,563,780  1/1986  Shakalis ........................... 137/468

*Primary Examiner*—William E. Wayner
*Attorney, Agent, or Firm*—Michael I. Kroll

[57] ABSTRACT

An electronically controlled hot/cold water system including a temperature controlled mixing valve in flow series with an automatically controlled volume controlled valve. The system includes a T-fitting having one inlet connected to the outlet of the volume valve, one inlet connected to a manually controlled hot/cold mixing valve and one outlet connected to a point of use such as a shower head.

14 Claims, 1 Drawing Figure

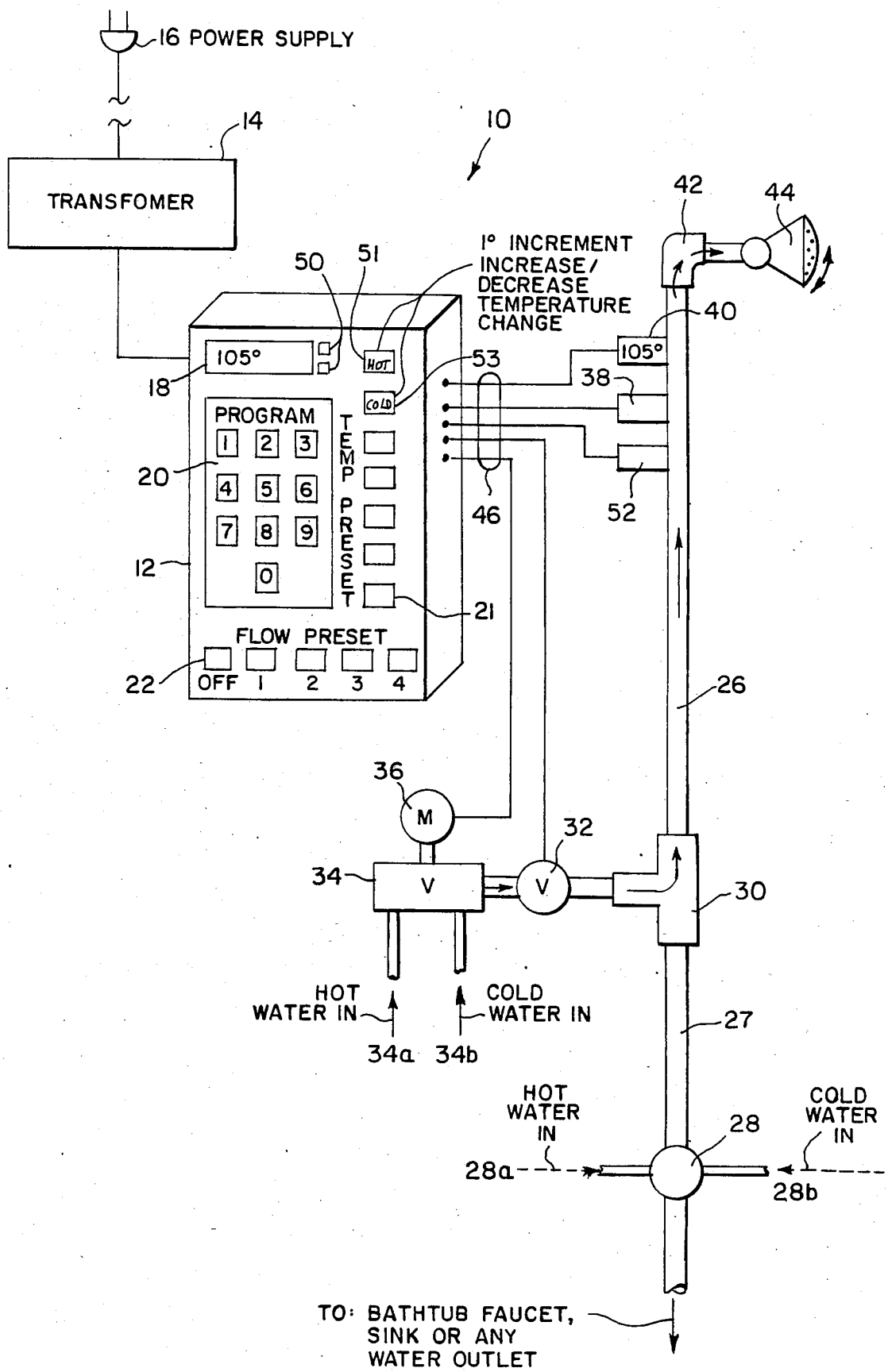

ELECTRONIC FLUID TEMPERATURE FLOW CONTROL SYSTEM

BACKGROUND OF THE INVENTION

The instant invention relates generally to the field of fluid control systems, and, more specifically, to those which may be used to program and control the flow and temperature of fluid discharged from an outlet. One outstanding example of such an application is the control of these parameters in a shower.

In conventional use, the temperature and pressure of the discharge from a shower head are manually controlled using a combination of individual and mixing valves. As pressure or temperature to either the hot or the cold water lines vary, both the pressure and temperature at the shower head vary in unpredictable ways. However, even if the pressure and temperature at the input to the mixing system were to remain constant, setting a desired temperature and pressure is still very much a trial and error process.

SUMMARY OF THE INVENTION

It is, therefore, a primary object of the present invention to provide an electronic fluid temperature flow control system which can maintain a constant pre-programmed temperature.

Another object is to provide an electronic fluid temperature flow control system which can maintain a constant pre-programmed rate of flow.

A further object is to provide an electronic fluid temperature flow control system which, when disabled, allows manual control of the system.

A still further object is to provide an electronic fluid temperature flow control system which displays the temperature and rate of fluid flow both at the controller and remotely as needed.

Another still further object is to provide an electronic fluid temperature flow control system which offers a number of preset temperature and fluid flow rates which can be incremented and decremented as desired.

Further objects of the invention will appear as the description proceeds.

To the accomplishment of the above related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a diagrammatic view of the invention illustrating its application to the temperature and rate of flow control of a shower.

DETAILED DESCRIPTION OF THE PREFERRED EMBODIMENTS

The invention 10 may be thought of as a dual closed-loop control system for the control and maintenance of fluid temperature and rate of flow. In the automatic mode, hot water 34a and cold water 34b are inputted to a dual temperature mixing valve 34 controlled by mixing valve actuating motor 36. The mixed water then continues through volume control valve 32, through T-fitting 30 and connecting tube 26, elbow fitting 42, and, finally, is discharged through fluid outlet 44 as indicated by the solid arrows. Both mixing valve actuator 36 and volume flow control valve 32 are fast-acting and can quickly respond to electrical inputs.

A temperature sensor 38 samples the temperature of water passing through connecting tube 26 and sends a signal proportional to this temperature to controller 12 via conduit 46. Similarly, flow sensor 52 samples the rate of flow of water passing through connecting tube 26 and sends a signal proportional to this rate of flow to controller 12 via conduit 46. The controller interprets these signals and outputs corrective signals to mixing valve actuating motor 36 and volume control valve 32 thereby closing both control loops.

Controller 12 is provided with a keyboard 20 which allows a number of temperature presets to be established at each temperature present typified by 21. The keyboard similarly allows a number of rate of flow presets to be established at each flow preset typified by 22. The presets or the actual readings of temperature and rate of flow may be read on temperature/flow display 18. The quantity to be measured is determined by the activation of either of buttons 50. The temperature may also be incremented or decremented from the presets in 1° steps using buttons 51 and 53 respectively. The temperature and rate of flow may also be read by the bather via a remote temperature/flow display 40. The system is powered from the ac line via power supply plug 16 and transformer 14.

If manual operation is desired, volume control valve 32 is turned off. An alternate water pathway, shown in dashed lines, consists of hot water inputted at 28a, cold water inputted at 28b, the pre-existing bathtub mixing valve 28 and bathtub interface tube 27. The remainder of the water pathway, T-fitting 30, connecting tube 26, elbow fitting 42 and fluid outlet 44 remain unchanged.

While certain novel features of this invention have been shown and described and are pointed out in the annexed claims, it will be understood that various omissions, substitutions and changes in the forms and the details of the device illustrated and in its operation can be made by those skilled in the art without departing from the spirit of the invention.

What is claimed is:

1. An electronic fluid temperature and flow control system comprising:
   (a) a source of hot and cold pressurized fluid;
   (b) a dual temperature mixing valve which, at its output, controls the ratio of said hot to said cold fluid;
   (c) a mixing valve actuator motor which activates said dual temperature mixing valve depending upon electrical signals inputted to said motor;
   (d) a fluid outlet;
   (e) a connecting type, one end of which is connected to said fluid outlet;
   (f) an electrically controlled volume flow control valve connected between the output of said dual temperature mixing valve and the end of said connecting tube opposite said fluid outlet such that the volume fo fluid released from said fluid outlet is modulated according to electrical signals inputted to said volume control valve;
   (g) a temperature sensor, mounted to said connecting tube, such that the electrical output of said temperature sensor is proportional to the temperature of fluid passing through said connecting tube;

(h) a flow sensor, mounted to said connecting tube, such that the electrical output of said flow sensor is proportional to the rate of flow of said fluid passing through said connecting tube;

(i) an electrical controller which uses the signal outputted by said temperature sensor to modulate the signal inputted to said mixing valve actuating motor, thereby controlling the temperature of the fluid discharge from said fluid outlet; and, also uses the signal outputted by said flow sensor to modulate the signal inputted to said volume flow control valve, thereby controlling the rate of flow of the fluid discharged from said fluid outlet; and, (j) a T-fitting, two of whose legs are connected between the output of said volume control valve and said connecting tube, wherein the third leg is connected to a conventionally manually controlled source of pressurized liquid, so that when said volume flow control valve is turned off, said conventional source is capable of being used to manually control the temperature and rate of flow of liquid discharged from said water outlet.

2. An electronic fluid temperature and flow control system, as recited in claim 1, wherein said controller is programmable to permit a multiplicity of temperatures to be preset and maintained.

3. An electronic fluid temperature and flow control system, as recited in claim 2, wherein said controller permits manually controlled incremental deviation from said preset temperature.

4. An electronic fluid temperature and flow control system, as recited in claim 1, wherein said controller is programmable to permit a multiplicity of rates of flow to be preset and maintained.

5. An electronic fluid temperature and flow control system, as recited in claim 1, wherein said controller further comprises a first temperature/flow display which shows the temperature and rate of flow of said fluid as it passes through said connecting tube.

6. An electronic fluid temperature and flow control system, as recited in claim 1 further comprising a second temperature/flow display mounted remotely.

7. An electronic fluid temperature and flow control system, as recited in claim 1, wherein said fluid is water and said fluid outlet is a shower head.

8. An electronic fluid temperature and flow control system, as recited in claim 1, wherein said controller is programmable to permit a multiplicity of temperatures to be preset and maintained.

9. An electronic fluid temperature said flow control system, as recited in claim 1, wherein said controller permits manually controlled incremental deviation from said preset temperature.

10. An electric fluid temperature and flow control system, as recited in claim 1, wherein said controller is programmable to permit a multiplicity of rates of flow to be preset and maintained.

11. An electronic field temperature and flow control system, as recited in claim 1, wherein said controller further comprises a first temperature/flow display which shows the temperature and rate of flow of said fluid as it passes through said connecting tube.

12. An electronic fluid temperature and flow control system, as recited in claim 1 further comprising a second temperature/flow display mounted remotely.

13. An electronic fluid temperature and flow control system, as recited in claim 1, wherein said fluid is water and said fluid outlet is a shower head.

14. An electronic fluid temperature and flow control system, as recited in claim 1, wherein said conventional manually controlled source of pressurized liquid is a conventional bathtub water faucet with mixing valve and shower outlet.

* * * * *